US006934768B1

(12) United States Patent
Block et al.

(10) Patent No.: US 6,934,768 B1
(45) Date of Patent: Aug. 23, 2005

(54) DYNAMIC MODIFICATION OF FRAGMENTATION SIZE CLUSTER COMMUNICATION PARAMETER IN CLUSTERED COMPUTER SYSTEM

(75) Inventors: Timothy Roy Block, Rochester, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 09/694,599

(22) Filed: Oct. 23, 2000

(51) Int. Cl.$^7$ ............................................. G06F 15/16
(52) U.S. Cl. ....................... 709/248; 709/250; 709/228
(58) Field of Search ............................... 709/221, 249, 709/327, 227, 228, 248; 714/4

(56) References Cited

U.S. PATENT DOCUMENTS

| | | | |
|---|---|---|---|
| 6,047,323 A | * | 4/2000 | Krause ........................ 709/227 |
| 6,108,699 A | * | 8/2000 | Moiin ......................... 709/221 |
| 6,119,163 A | * | 9/2000 | Monteiro et al. ........... 709/227 |
| 6,192,417 B1 | * | 2/2001 | Block et al. ................. 709/249 |
| 6,292,905 B1 | * | 9/2001 | Wallach et al. ................. 714/4 |

* cited by examiner

*Primary Examiner*—Hosain Alam
*Assistant Examiner*—Benjamin R Bruckart
(74) *Attorney, Agent, or Firm*—Wood, Herron & Evans, LLP

(57) ABSTRACT

An apparatus, program product and method support the dynamic modification of cluster communication parameters such as a fragmentation size parameter through controllably deferring the processing of a requested fragmentation size change in a source node until after receipt an acknowledgment message for at least one unacknowledged message sent by the source node to a plurality of target nodes. By controllably deferring such processing until it is confirmed that any such previously-unacknowledged messages sent by a source node have been received by any target nodes, synchronization between the source node and the target nodes may be obtained, and a fragmentation size change may occur in a coordinated fashion such that future messages from the source node to the target node will be processed by both the source and the target nodes using the modified fragmentation size parameter.

11 Claims, 4 Drawing Sheets

DYNAMIC MODIFICATION OF FRAGMENTATION SIZE CLUSTER COMMUNICATION PARAMETER IN CLUSTERED COMPUTER SYSTEM

CROSS-REFERENCE TO RELATED APPLICATIONS

This application is related to U.S. patent application Ser. No. 09/694,586, filed on even date herewith by Timothy Roy Block et al., entitled "DYNAMIC MODIFICATION OF CLUSTER COMMUNICATION PARAMETERS IN CLUSTERED COMPUTER SYSTEM", the disclosure of which is incorporated by reference herein.

FIELD OF THE INVENTION

The invention is generally directed to clustered computer systems, and in particular, to the control of communications between cluster nodes based on configurable communication parameters.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

As with most computer systems, clustered computer systems are often configurable so as to maximize performance within a particular application. Moreover, since communication between nodes in a clustered computer system is often a critical path in controlling system performance, many clustered computer systems have a number of configurable low-level communication parameters that control how each node operates in the system.

As an example, many clustered computer systems implement controlled fragmentation of cluster messages. Fragmentation is a process whereby large messages are broken up into multiple, smaller packets, prior to being sent across a network. The packets may be permitted to arrive at a destination in different orders, and through the utilization of identifiers in the packets, received packets may be automatically reassembled in their original order to reconstruct the original message.

From the standpoint of networking hardware, fragmentation facilitates packet transmissions since the hardware is able to work with relatively smaller batches of data at a time. Furthermore, when combined with the reliability functionality inherent in some networking protocols such as the Transmission Control Protocol (TCP), fragmentation can reduce the amount of network traffic since packets may often be selectively resent instead of requiring an entire message to be resent in the event of a failure to deliver any portion of a message.

Some clustered computer systems implement fragmentation directly within the cluster messaging services that control the transmission of cluster messages between cluster nodes, typically for the purpose of implementing reliability functionality over an underlying networking protocol such as User Datagram Protocol (UDP) that advantageously supports multicasting of messages to multiple receivers but does not natively support the same degree of reliability as other protocols such as TCP. Such systems, however, are still often built on top of a lower level networking protocol such as the Internet Protocol (IP) that natively supports fragmentation for the purpose of preventing buffer overruns in networking hardware.

Fragmentation algorithms typically rely on a fragmentation size parameter (also known as a maximum transmission unit (MTU)) that sets the maximum packet size, and thus, the places within a message along which the message is fragmented. To prevent fragmentation from occurring at the lower network layer, therefore, the fragmentation size parameter utilized in cluster messaging services must be less than or equal to the MTU for the underlying networking protocol. Furthermore, since the networking protocol MTU is hardware dependent (typically based upon the sizes of the internal buffers in the hardware), the cluster messaging service fragmentation size parameter must be set based upon the smallest networking protocol MTU for any networking hardware along the communications path between cluster nodes.

To minimize the overhead of packet headers, and thus maximize system performance, it is desirable to utilize as large a fragmentation size as possible. Given, however, that hardware devices may vary in different clustering environments, and that hardware devices may be replaced or upgraded over time with higher performance devices, a strong need exists for a manner of setting fragmentation size in a clustered computer system to a maximum allowable value for any particular clustered computer system.

Conventional clustered computer systems permit low-level communication parameters such as fragmentation sizes to be individually set on different nodes. However, such settings are typically made via configuration files that are read during startup, and thus, these parameters are often not capable of being modified without requiring a node, or an entire clustered computer system, to be taken off line and restarted.

Given the desirability of maximizing availability in clustered computer systems, it would be extremely beneficial to permit such parameters to be modified dynamically, without requiring a node or system to be taken off line. Conventional clustered computer systems, however, lack any such functionality, and thus any modifications made to such systems require at least some interruption of availability.

Moreover, it has been found that many cluster communication parameters utilized by cluster nodes are not capable of simply being modified locally on a node without some degree of coordination with other nodes. As an example, modifying the fragmentation size on a sending or source node requires coordination with any receiver or target nodes so that such target nodes process any received messages using the correct fragmentation size.

Therefore, a significant need exists in the art for a manner of reliably modifying cluster communication parameters in a clustered computer system with reduced effect on system availability.

SUMMARY OF THE INVENTION

The invention addresses these and other problems associated with the prior art in providing an apparatus, program product and method that support the dynamic modification of cluster communication parameters such as a fragmentation size parameter through controllably deferring the processing of a requested fragmentation size change in a source node until after receipt of an acknowledgment message for at least one, and typically all, outstanding unacknowledged messages sent by the source node to a plurality of target nodes. By controllably deferring such processing until it is confirmed that any such previously-unacknowledged messages sent by a source node have been received by any target nodes, synchronization between the source node and the target nodes may be obtained, and a fragmentation size change may occur in a coordinated fashion such that future messages from the source node to the target node will be processed by both the source and the target nodes using the modified fragmentation size parameter. Moreover, given the coordinated fashion in which the modification of a fragmentation size parameter occurs, such modification may be implemented typically with little or no interruption in messaging between nodes, and thus with little or no effect on system availability.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
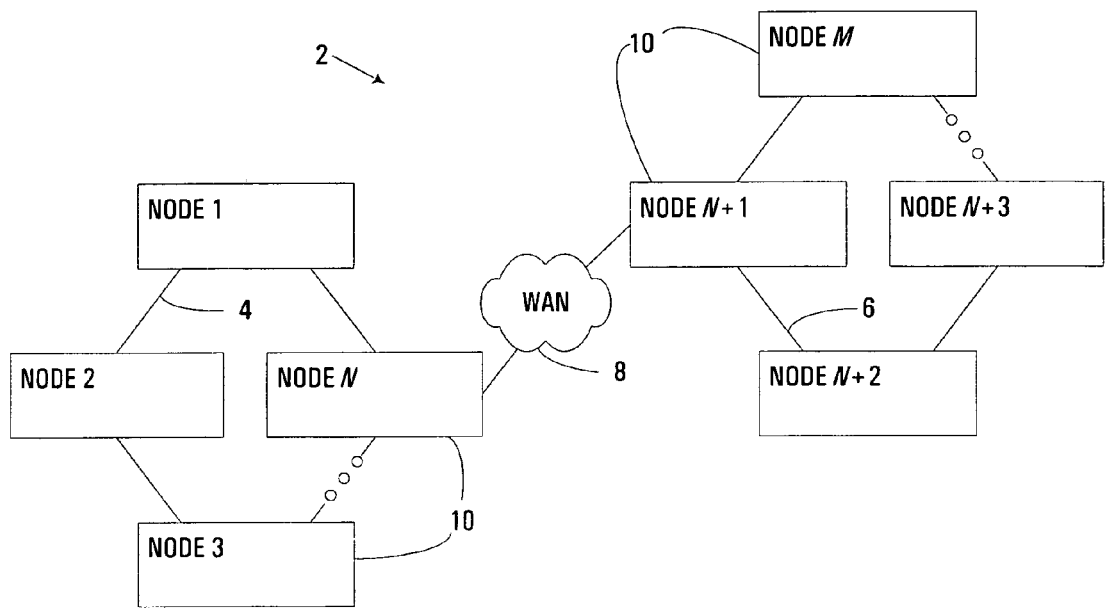
FIG. 1 is a block diagram of a clustered computer system consistent with the invention.

The embodiments described hereinafter utilize a distributed protocol to ensure efficient and reliable modification of cluster communication parameters, in particular of a fragmentation size parameter, with little or no effect on system availability. Turning to the Drawings, wherein like numbers denote like parts throughout the several views, FIG. 1 illustrates an exemplary clustered computer system 2 including a plurality of nodes 10 interconnected with one another in a distributed manner, e.g., via local area networks (LAN's) 4, 6 and a wide area network (WAN) 8. Any number of network topologies commonly utilized in clustered computer systems may be used consistent with the invention. Moreover, individual nodes 10 may be physically located in close proximity with other nodes, or may be geographically separated from other nodes, as is well known in the art. By virtue of the flexible nature of the herein-described dynamic cluster communication parameter control, however, it will be appreciated that various communication parameters for the system may be tailored to optimize performance and reliability of the system through optimizing the parameter settings on each node. Thus, a wide variety of interconnection types, network types, node types, etc., may be permitted to coexist with one another in an efficient and reliable manner. Furthermore, should the network topology ever be modified, individual nodes may be modified so as to update cluster communication parameters associated therewith. Of significant importance in this regard is that such modifications can often be made without having to take any node offline, which is an important concern in practically every clustering environment.

Figure 2:
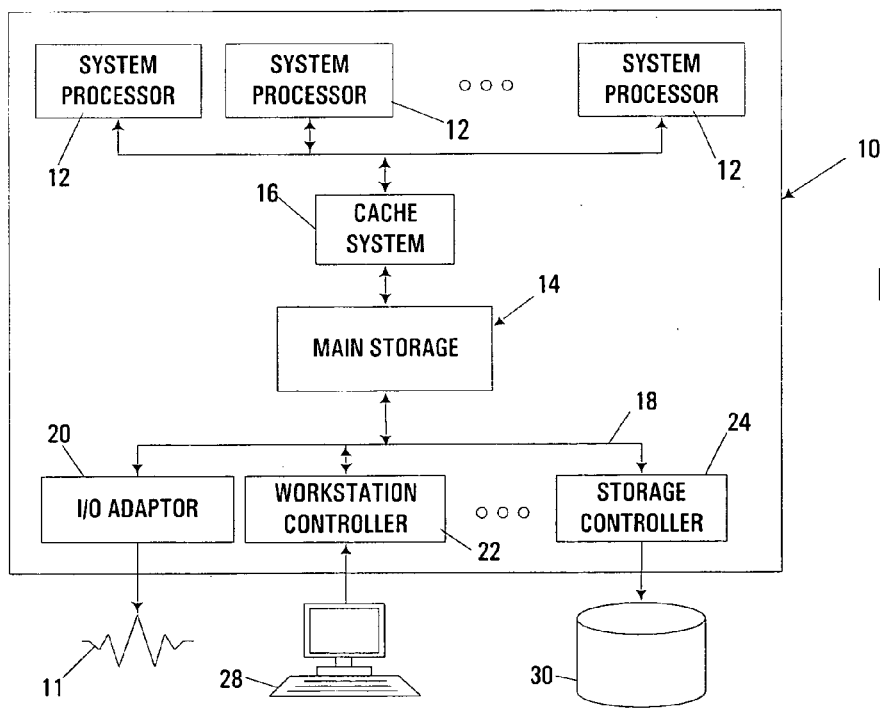
FIG. 2 is a block diagram of a node in the clustered computer system of FIG. 1.

Now turning to FIG. 2, an exemplary hardware configuration for one of the nodes 10 in clustered computer system 2 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 11), one or more workstations 28, and/or one or more storage devices such as a direct access storage device (DASD) 30. Any number of alternate computer architectures may be used in the alternative.

Figure 3:
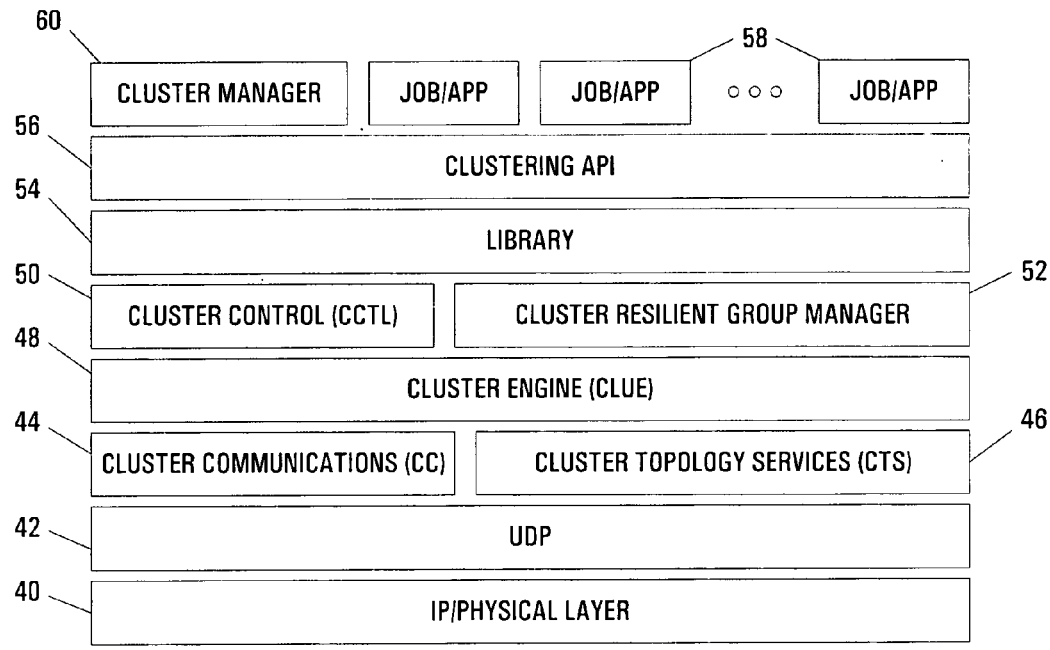
FIG. 3 is a software layer diagram of the principal clustering software components utilized in the node of FIG. 2.

As shown in FIG. 3, the principal software components executed within each node 10 include an IP/physical layer component 40, a UDP component 42, a cluster communications (CC) component 44, a cluster topology services (CTS) component 46, a cluster engine (CLUE) component 48, a cluster control (CCTL) component 50, a cluster resilient group manager component 52, a library component 54, a clustering API component 56, and a plurality of jobs/applications 58, including a cluster manager application 60.

Generally, IP/physical layer component 40 provides an industry standard communications stack and physical interface with a network. UDP component 42 provides a packet transmission protocol, and CC component 44 provides support for reliable multicast clustering communication services, e.g., as discussed in greater detail in U.S. patent application Ser. No. 09/280,469, filed by Block et al. on Mar. 30, 1999 (the "reliable multicasting application"), the disclosure of which is incorporated by reference herein.

CTS component 46 monitors the network topology of a clustered computer system, and stores information such as the layout of nodes, the specifications of network interconnects between nodes, the geographical locations of nodes, and node status information. CLUE component 48 provides a distributed ordered group messaging service. It is also within CLUE component 44 and CTS component 46 that much of the low level cluster communication parameters and the support routines for dynamically and locally modifying such parameters consistent with the invention is implemented.

CCTL component 50 manages the configuration and activation of clustering on a node, typically supporting various cluster initialization and node management operations suitable for managing a clustered environment. It is also within this layer that coordination of dynamic modifications by multiple nodes via the herein-described distributed parameter modification protocol is provided.

Cluster resilient group manager component 52 synchronously maintains copies of group membership status information across the cluster, while library component 54 provides other support services for a cluster. Clustering API component 56 provides the external interface to the underlying clustering functionality via jobs/applications 58. Among the functionality supported is that of dynamic cluster communication protocol modifications, managed for example by a cluster manager application 60 that provides the user interface whereby a user such as a systems administrator can initiate the modification of cluster communication parameters.

The discussion hereinafter will focus on the specific routines utilized to implement the above-described dynamic cluster communication parameter modification functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM' s, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Dynamic Cluster Communication Parameter Modification

Figure 4:
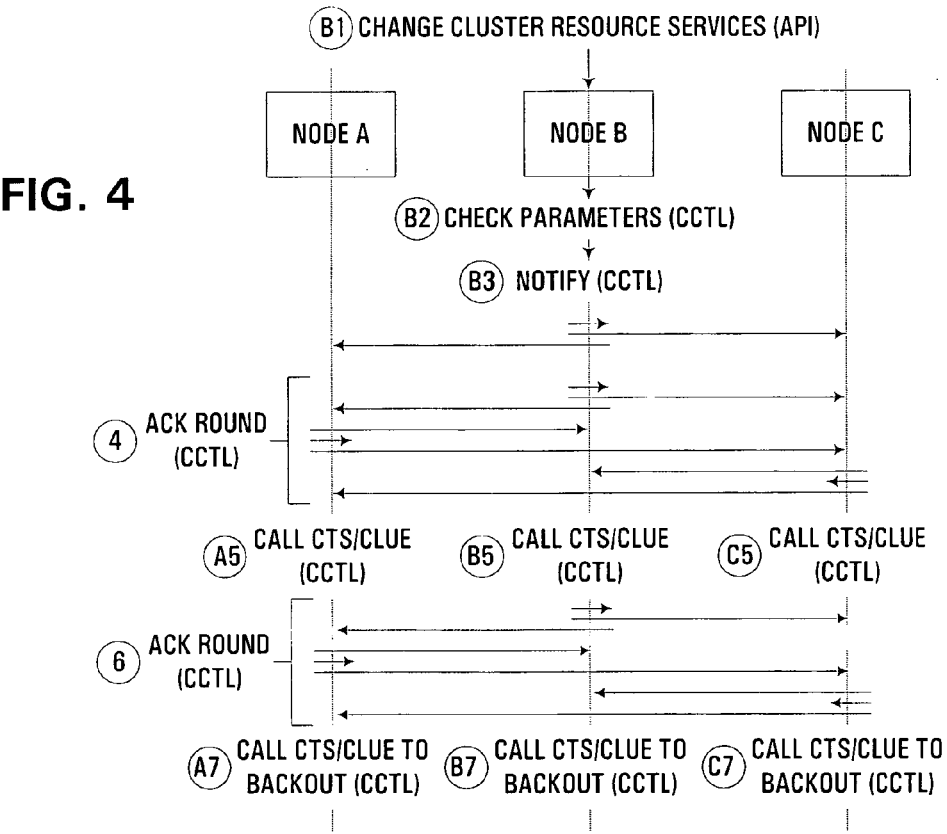
FIG. 4 is a sequence diagram illustrating the sequence of operations that occur during dynamic modification of a cluster communication parameter by the clustered computer system of FIG. 1.

Turning now to FIG. 4, a distributed protocol for effecting dynamic modifications to cluster communication parameters across a plurality of cluster nodes is generally illustrated. With the herein-described distributed protocol, initiation of a parameter modification is handled via the distribution of a message or other form of request to each node affected by a parameter modification. Thereafter, individual nodes are configured to locally track or confirm receipt of an initiating message by all affected nodes, as well as to locally modifying their respective parameters as appropriate and reporting the results, e.g., a successful/unsuccessful status, back to the other affected nodes so that each such node can locally determine the success or failure of the distributed protocol in carrying out a parameter modification request. Furthermore, each affected node is typically configured to automatically undo any local parameter modification in response to detection of a failed protocol resulting from the inability of one or more affected nodes to successfully carry out a parameter modification request.

The term "local", as used herein, generally refers to the scope of a particular node in a clustered computer system, whereby if a particular action occurs locally, that action is typically implemented directly within and on behalf of a particular node. It will also be appreciated by one of ordinary skill in the art that not all nodes in a clustered computer system need necessarily participate in a cluster communication parameter modification. Only those nodes that are affected by a modification, e.g., where a local value for a particular parameter is updated in response to a modification request, or where modifications made to one node are required to be known by another node, need participate in the herein-described distributed protocol.

Moreover, a wide variety of cluster communication parameters may be modified using the herein-described protocol. For example, much of the discussion hereinafter will focus on the modification of a fragmentation size parameter (also referred to as a maximum transmission unit (MTU) parameter), although a number of additional parameters are discussed in greater detail in the aforementioned cross-referenced application. It will be appreciated that for many parameters local changes may not affect other nodes, and as such, the need for a distributed protocol as discussed herein may not be as great for modifying some types of parameters. It will also be appreciated that practically any conceivable form of cluster communication parameter may be dynamically modified in the general manner discussed herein.

FIG. 4, in particular, illustrates three exemplary Nodes A, B & C for which it is desirable to initiate a dynamic parameter modification consistent with the invention. Assume, for example, that Node B is the node from which a dynamic modification operation is initiated, e.g., via a cluster manager application executing on Node B. As represented by Step B1, initiation of a dynamic modification operation may occur via an API call to the cluster control component of the node to access the change cluster resource services supported via the cluster control component.

At Step B2, the parameter(s) to be modified may be checked for validity and conformance with any range limitations established for the system. Then, in Step B3, every affected node is notified of the request via multicasting of a notify message to all affected nodes.

Subsequent to the multicast, each node participates in an acknowledgment (ACK) round as illustrated at step 4, whereby every node transmits an ACK message to every other node to indicate its receipt of the multicast dynamic parameter modification request.

By virtue of the localized tracking of ACK messages within each node during the ACK round, each node is then capable of confirming that each affected node has in fact received the modification request. Thus, at Steps A5, B5 and C5, each of Nodes A, B & C calls a local, and often lower level (e.g., the CTS and/or CC components of FIG. 3), routine to locally modify each's respective value for the parameter being modified. It will be appreciated that such parameter modifications may occur concurrently with one another in the various nodes. Moreover, as will become more apparent below, additional coordination operations, including distributing messages among components during the local modifications, may also be required should it be necessary to control the order in which the individual nodes modify their respective parameter values.

Upon completion of the local modification routines, each node typically knows the result, or completed status, of its local routine. As a result, in a subsequent ACK round at Step 6, each node may be configured to multicast its result information to every other affected node such that, at the completion of the second ACK round, each node has sufficient information to determine the status of every other affected node. Consequently, based upon the results obtained by each node, Steps A7, B7 and C7 may need to be performed to back out, or "undo," any changes made to particular nodes when the same changes were not successfully made to other nodes in the clustering environment. However, since each node typically receives result, or status, information as a result of the second ACK round, each node is also able to locally determine whether any such undo operations are required without resort to additional communications between nodes.

Figure 5:
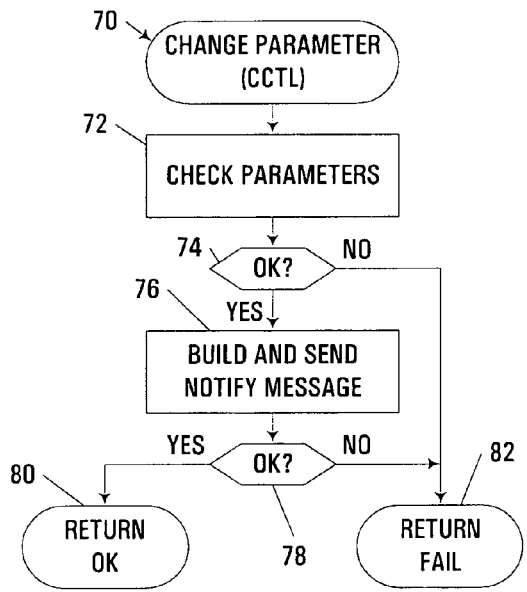
FIG. 5 is a flowchart illustrating the program flow of a change parameter routine executed by the cluster control component of FIG. 3 on an initiator node in the clustered computer system of FIG. 1.
Figure 6:
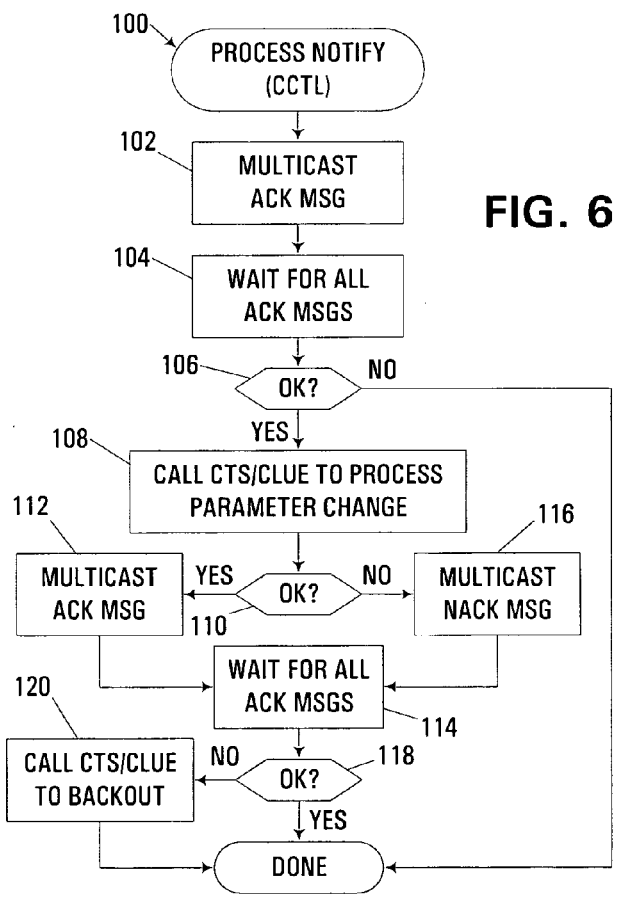
FIG. 6 is a flowchart illustrating the program flow of a process notify routine executed by the cluster control component of FIG. 3 on each node in the clustered computer system of FIG. 1.

FIGS. 5 and 6 next illustrate the initiation and distributed phases of a dynamic communication parameter modification operation consistent with the invention. FIG. 5 in particular illustrates a change parameter routine 70, executed, for example, via an API call made via a job or application. As mentioned above, typically the overall management of dynamic modifications from a cluster level is implemented in the CCTL component of FIG. 3, although the invention should not be limited specifically as such.

Routine 70 begins in block 72 by checking the parameters in the manner discussed above in connection with Step B2 above. Next, block 74 determines whether the check was successful. If so, control passes to block 76 to build and send a "notify" message to all affected nodes (here also including the initiating node) and thereby "kick-off" the protocol. Upon completion of block 76, block 78 determines whether the overall action was successful or not—i.e., whether any node in the cluster failed to process the request. If successful, control passes to block 80 to return an "OK" status and terminate the routine. If not successful, or if the parameter check determined the call to have any errors, control is passed to block 82 to return a "failed" result and terminate the routine.

FIG. 5 next illustrates a process notify routine 100, also executed by the CC component in each node, for use in processing the herein-described distributed protocol. Routine 100 is executed by each affected node receiving an initiation message, typically including the initiating node.

Routine 100 begins in block 102 by multicasting an ACK message to indicate local receipt of the initiation request by the node. Control then passes to block 104 to wait for all ACK messages to be received from all affected nodes. If the ACK round is not successful (e.g., if one or more nodes do not timely respond), routine 100 terminates. Otherwise, control 108 performs a call to a lower level clustering service that performs the local parameter modification on behalf of the node (here the CTS and/or CLUE components).

In the illustrated embodiment, the local parameter modification call is synchronous, and thus the process running routine 100 is held while the local modification is being processed. Upon completion of the local modification, status information is returned to routine 100, and the routine is released.

Block 110 then determines whether the call was successful or not, e.g., via conventional return of status information by the lower level routine. If so, control passes to block 112 to multicast an ACK message, and then to block 114 to wait for all other ACK messages to be received. If not, control passes from block 110 to block 116 to multicast a no acknowledgment (NACK) message indicating that the request failed on that node, and then to block 114 to wait for messages from any remaining active nodes in the system.

Next, block 114 passes control to block 118 to determine whether the ACK round was successful, i.e., whether an ACK message was received from every affected node indicating that the node was able to successfully modify the parameter. If so, routine 100 is complete. If, on the other hand, the ACK round indicated a failure (e.g., in response to receipt of a NACK message, or the time out of one or more nodes without sending any ACK message in a predetermined time period), control passes to block 120 to call the appropriate low level routine to essentially "undo" the local modification made on the node. Thus, by virtue of the localized determination of node status within each interconnected node, it can be ensured without substantial synchronization among nodes that a requested modification will be processed on all affected nodes.

Undoing an operation may be performed in a number of manners consistent with the invention. For example, previous parameter values may be maintained so that a second modification operation could be performed to replace the new values with the previous values. In the alternative, modifications may be effected through a two-step process, whereby modifications are first made temporarily and then permanent.

Other modifications will become apparent to one of ordinary skill in the art.

Dynamic Fragmentation Size Parameter Modification

As discussed above, one example of a local cluster communication parameter modification operation for the herein-described dynamic modification functionality is that of a fragmentation size parameter modification operation. A fragmentation size parameter in this context generally refers to the maximum size packet size, also referred to as a maximum transmission unit (MTU) that may be used for cluster messages, and thus, the "break point" for fragmenting messages into separate packets.

As mentioned above, controlling the fragmentation size of cluster messages at a higher layer than the lowest-level network services (e.g., in the UDP and/or IP/Physical layer components) permits reliable multicast messaging functionality to be implemented in a "best effort" protocol such as UDP. Consequently, reliability functionality (e.g., selective retransmission of lost packets and automated reassembly of messages) conventionally supported by a protocol such as TCP (which does not directly support multicasting), may still be implemented in a multicast environment. The reader is directed to the aforementioned reliable multicasting application for a more detailed discussion of the multicasting functionality utilized in the illustrated embodiment.

In the illustrated embodiment, any node capable of sending messages to other nodes in a cluster functions as a source node, and any node capable of receiving messages from other nodes functions as a receiver or "target" node. Often, a node will be capable of functioning as both a source node and a target node. Moreover, to support group communications, each source node includes at least one connection, with each connection associated with a group, and functioning as a logical connection between the source node and every other member node in the group. Given that a node may be a member of more than one group, a node may use more than one connection.

Furthermore, in the illustrated embodiment each connection includes a dedicated queue of pending messages, one such queue for each group. Furthermore, each connection typically executes in a separate thread, and utilizes its own local MTU value. As such, one component of updating a fragmentation size in the illustrated embodiment is that of updating the MTU in each connection for a source node that is being updated. However, it should be appreciated that single logical connections may be used in other embodiments.

Figure 7:
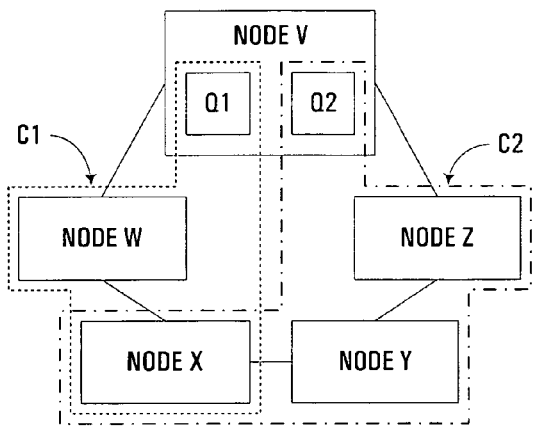
FIG. 7 is a block diagram of another clustered computer system consistent with the invention, illustrating an arrangement of collections defined for a source node belonging to multiple groups.

FIG. 7 illustrates an exemplary clustered computer system that includes a plurality of nodes V, W, X, Y and Z. Node V is considered a member of two groups: that of Nodes V, W and X; and that of Nodes V, X, Y and Z. Thus, from the perspective of Node V as a source node, two connections, C1 and C2 are defined. Also, for each connection C1, C2, an associated pending message queue Q1 and Q2 is maintained in Node V.

It should be appreciated that, for any fragmented message to be properly received by a target node, the MTU used during processing of incoming message fragments should match that of the sending node. As such, it is important to ensure that the modification of the MTU value stored in a source node is coordinated with the MTU values in the receivers across all connections over which the source node communicates.

In the illustrated embodiment, such coordination is implemented through the use of synchronization, or "sync" messages that are inserted into an ordered arrangement of pending messages to force any previously pending messages for a given connection to clean up, so that a future fragmentation change can occur thereafter. It is also assumed for the purposes of this embodiment that each connection, running under a separate thread, can be selectively suspended while other connections proceed, and that each connection maintains a local MTU value. For other embodiments where the logical construct such as a connection is not used, an MTU value may be global to a particular node. However, when multiple connections are capable of being handled independently, it may be possible during updating of fragmentation size within a clustered computer system for different connections to temporarily be using different fragmentation sizes, as well as for receivers and senders on a given node to be using different fragmentation sizes as well.

Figure 8:
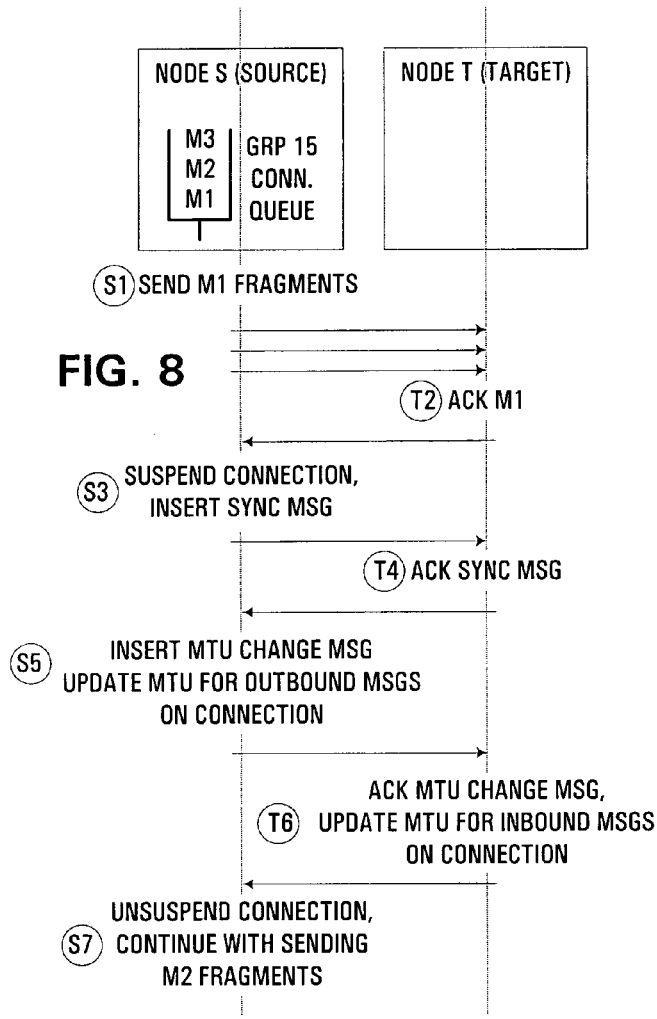
FIG. 8 is a sequence diagram illustrating the sequence of operations that occur during dynamic modification of a fragmentation size parameter responsive to invocation of a local cluster communication parameter modification operation on each node of the clustered computer system of FIG. 1.

FIG. 8, for example, illustrates an exemplary sequence of operations between a source Node S and a target Node T with respect to an exemplary connection "15", having a pending message queue (here shown with 3 messages M1, M2 and M3).

As shown at Step S1, assume first that, as of a request to change an MTU, one message (message M1) is pending on the queue. At that time, the source node sends one or more fragments of message M1 using the previous, or current, MTU value stored for that node.

Next, at Step T2, the M1 message is acknowledged by each target node. In the illustrated embodiment, the acknowledgment message used to acknowledge receipt of message M1 may be capable of supporting multiple message acknowledgment, whereby one acknowledgment (ACK) message may identify multiple messages or message fragments being acknowledged (e.g., via specifying a range of message identifiers). In other embodiments, however, ACK messages may be sent for each received packet.

After acknowledgment of message M1, Node S then suspends its connection at Step S3, and inserts a "sync" message into the pending message queue (here immediately after message M1, and before messages M2 and M3). In response, each target Node T acknowledges the sync message in Step T4. The ACK message may also specify and acknowledge any messages that have been successfully received between steps T2 and T4. It may also be desirable to include an indicator or bit in the sync message to trigger an immediate response from all group members, should it be desirable to controllably defer ACK's and send such ACK's within a single message at a later time as is well known in the art. In the latter instance, typically ACK messages are sent only after a timer expires, so that ACK messages will only be sent periodically, and not immediately in response to each and every message.

Next, in Step S5, once the sync message has been fully acknowledged, Node S issues an insert MTU (fragmentation size) change message on the Node S queue for transmission to each target node for the connection. In addition, either before or after Step S5, the local (outbound) MTU may be updated in the source Node, since it is assumed that the pipelines to the other nodes are clear subsequent to the sync message. Further, since the MTU change message will typically be smaller than any fragmentation size in the clustered system, sending the MTU change message with a different MTU from its target nodes would typically not introduce any potential errors.

Next, in Step T6, upon receipt of each MTU change ACK message in a target node, an ACK message is returned to the source Node S. In addition, the local MTU for inbound message traffic is set on the target Node T in Step T6.

Upon receiving the ACK messages from the target node (s) to acknowledge the receipt of the change request, Node S then unsuspends the connection in Step S7 and continues on with sending future messages (e.g., messages M2 and M3, which are queued up after queuing of the sync and MTU change messages), using the newly stored MTU value. At this point, each node in the connection has been updated with a new MTU.

Figure 9:
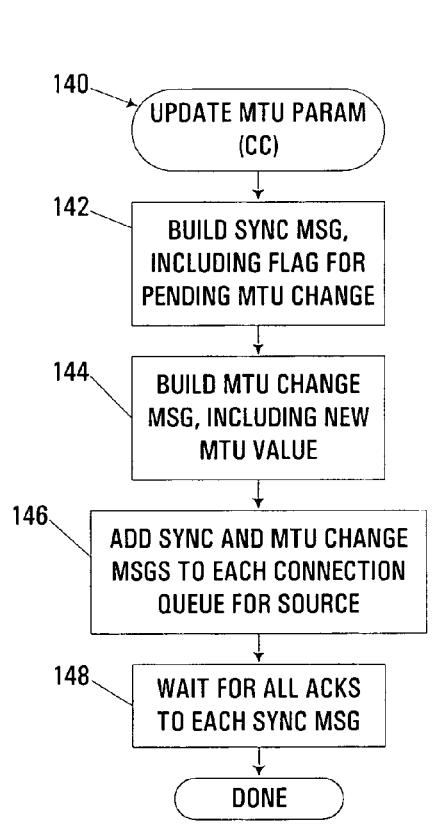
FIG. 9 is a flowchart illustrating the program flow of an update MTU parameter routine executed by the cluster communications component of FIG. 3 on a source node in the clustered computer system of FIG. 1.

FIGS. 9–12 illustrate exemplary routines suitable for implementing the aforementioned functionality. FIG. 9, for example, illustrates an update MTU parameter routine 140, which specifies a new fragmentation size, and which is typically called, for example, within block 108 of FIG. 6. Routine 140 begins in block 142 by building a sync message specifying a flag to indicate a pending MTU change. Next, block 144 builds an MTU change message, including a new MTU value.

Block 146 then adds the sync and MTU change messages in order to the end of each message queue for each connection affiliated with the source. Block 148 then suspends routine 140 until subsequent to receiving all ACK messages to the sync message. Such suspension may be implemented, for example, by setting a block count representing the total number of receivers on a connection and decrementing the count for each received ACK message. Other manners of suspending a thread may be used in the alternative.

Figure 10:
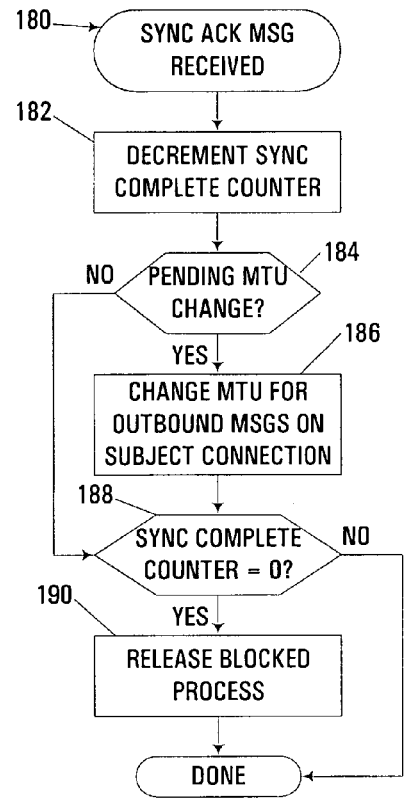
FIG. 10 is a flowchart illustrating the program flow of a sync ACK message received executed by the cluster communications component of FIG. 3 on a source node in the clustered computer system of FIG. 1.

For example, FIG. 10 illustrates a sync ACK message received routine 180 that is called whenever a sync message is complete—i.e., whenever all ACK messages for a sync message for a given connection have been received. Routine 180 operates by decrementing an outstanding sync complete counter in block 182. The counter is initially set to equal the number of connections to which sync messages have been sent (typically done in block 142). Next, it is determined whether the pending MTU change flag has been set (typically set in block 142), and if so, control passes to block 186 to change the local sender side MTU for the associated connection on the source node (i.e., for the connection identified in the received sync ACK message). Control then passes to block 188 to determine whether the sync complete counter equals zero, indicating that the MTU for all connections for the source node have been updated. If so, control passes to block 190 to release the blocked process, and routine 180 is complete. Moreover, returning to block 188, if the sync complete counter is not zero, block 190 is bypassed, and routine 180 terminates without releasing the blocked process. Furthermore, returning to block 184, if the pending MTU change bit is not set, block 186 is bypassed without updating the local MTU for the associated connection.

It should be noted that in the illustrated embodiment, each connection normally has the same MTU, although in some embodiments, connection-specific MTU's may be used. Moreover, given that the sync and MTU change messages are processed separately by each connection thread in each receiver node, each MTU change will occur at different times in many instances. However, it will be understood that, upon completion of block 148, it may be assumed that all receivers for all connections are ready to receive messages from the source node using the new MTU value, and thus, the source node may be updated without causing potential discrepancies with the target nodes.

Figure 11:
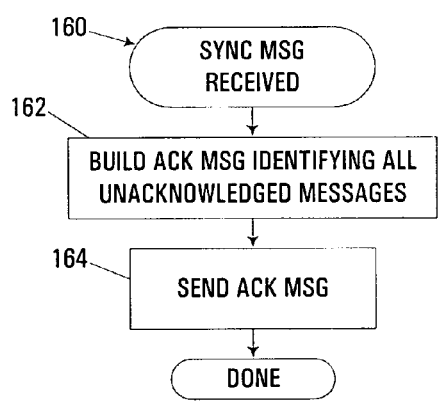
FIG. 11 is a flowchart illustrating the program flow of a sync message received routine executed by the cluster communications component of FIG. 3 on a target node in the clustered computer system of FIG. 1.

FIG. 11 next illustrates a sync message received routine 160 executed by a connection thread on a target node. Routine 160 essentially processes a sync message on behalf of a receiver node and a connection therefor by building in block 162 an ACK message identifying all unacknowledged, but received, messages. Block 164 then sends the ACK message, thereby immediately clearing up the connection pipe for the target node.

Figure 12:
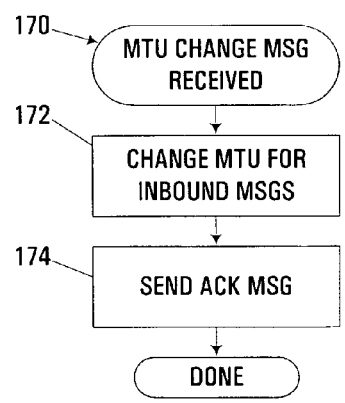
FIG. 12 is a flowchart illustrating the program flow of an MTU change message received routine executed by the cluster communications component of FIG. 3 on a target node in the clustered computer system of FIG. 1.

FIG. 12 next illustrates an MTU change message received message 170 that simply (in block 172) changes the MTU value on the local, target node for inbound messages to be received by that node. Block 174 then sends the ACK message, and routine 170 is complete. Upon completion of routine 170 on a particular node, and on behalf of a particular connection, the MTU change has been processed locally for that node.

Various modifications may be made without departing from the spirit and scope of the invention. For example, nodes may maintain connection-specific MTU values so that, for example, were a node a member of two groups, and one group was constrained by hardware limitations more than another, such a node could use different MTU sizes for different node transmissions. In addition, in some embodiments other fragmentation parameters, e.g., control over whether messages are acknowledged on a packet-by-packet basis or on a overall message basis, may be dynamically modified in the same manner as discussed herein.

Additional modifications will be apparent to one of ordinary skill in the art. Therefore, the invention lies in the claims hereinafter appended.

What is claimed is:

1. A method of dynamically modifying a fragmentation size cluster communication parameter in a clustered computer system, the method comprising:

deferring processing of a requested fragmentation size change until receipt of an acknowledgment message for at least one unacknowledged message sent by a source node to a plurality of target nodes;

thereafter processing the requested fragmentation size change to modify a fragmentation size cluster communication parameter used in transmitting messages from the source node to the plurality of target nodes;

thereafter sending messages from the source node to the plurality of target nodes using the modified fragmentation size cluster communication parameter; and sending a sync message from the source node to the plurality of target nodes;

wherein deferring processing of the requested fragmentation size change includes waiting for an acknowledgment message for the sync message from each of the plurality of target nodes, wherein processing the requested fragmentation size change includes sending a fragmentation size change message from the source node to the plurality of target nodes, the fragmentation size change message configured to modify the fragmentation size cluster communication parameter on each of the plurality of target nodes, wherein the source node comprises a message queue, wherein sending the sync message includes placing the sync message on the message queue and sending the fragmentation size change message includes placing the fragmentation size change message on the message queue, wherein the source node and the plurality of target nodes are members of a first group, wherein the source node is a member of a second group that further includes as members a second plurality of target nodes, wherein the source node further comprises a second message queue, wherein the source node includes first and second connections respectively associated with the first and second groups, wherein sending the sync message further includes placing the sync message on the second message queue to initiate, upon receipt by each target node in the second group, an immediate acknowledgment message from such target node that acknowledges receipt for each unacknowledged message received by such target node, and wherein sending the fragmentation size change message further includes placing the fragmentation size change message on the second message queue to modify the fragmentation size cluster communication parameter on each of the plurality of target nodes in the second group.

2. The method of claim 1, wherein the sync message is configured to initiate, upon receipt by each target node, an immediate acknowledgment message from such target node that acknowledges receipt for each unacknowledged message received by such target node.

3. The method of claim 1, wherein processing the requested fragmentation size change further includes modifying the fragmentation size cluster communication parameter on the source node.

4. The method of claim 1, further comprising sequentially issuing messages on the first and second message queues respectively using first and second threads executing on the source node.

5. An apparatus, comprising:
   a memory; and
   a program resident in the memory, the program configured to dynamically modify a fragmentation size cluster communication parameter in a clustered computer system by processing a requested fragmentation size change only after receipt of an acknowledgment message for at least one unacknowledged message sent by a source node to a plurality of target nodes;
wherein the program is further configured to process the requested fragmentation size change after receipt of the acknowledgment message to modify a fragmentation size cluster communication parameter used in transmitting messages from the source node to the plurality of target nodes, wherein the program is further configured to thereafter send messages from the source node to the plurality of target nodes using the modified fragmentation size cluster communication parameter; wherein the program is further configured to send a sync message from the source node to the plurality of target nodes such that deferring processing of the requested fragmentation size change includes waiting for an acknowledgment message for the sync message from each of the plurality of target nodes; wherein the program is configured to process the requested fragmentation size change by sending a fragmentation size change message from the source node to the plurality of target nodes, the fragmentation size change message configured to modify the fragmentation size cluster communication parameter on each of the plurality of target nodes, wherein the apparatus further comprises a message queue resident on the source node, wherein the program is configured to send the sync message and the fragmentation size change message by placing the sync message and the fragmentation size change message on the message queue, wherein the source node and the plurality of target nodes are members of a first group, wherein the source node is a member of a second group that further includes as members a second plurality of target nodes, the apparatus further comprising a second message queue resident on the source node, wherein the source node includes first and second connections respectively associated with the first and second groups, wherein the program is further configured to send the sync message by placing the sync message on the second message queue to initiate, upon receipt by each target node in the second group, an immediate acknowledgment message from such target node that acknowledges receipt for each unacknowledged message received by such target node, and wherein the program is further configured to send the fragmentation size change message by placing the fragmentation size change message on the second message queue to modify the fragmentation size cluster communication parameter on each of the plurality of target nodes in the second group.

6. The apparatus of claim 5, wherein the sync message is configured to initiate, upon receipt by each target node, an immediate acknowledgment message from such target node that acknowledges receipt for each unacknowledged message received by such target node.

7. The apparatus of claim 5, wherein the program is further configured to process the requested fragmentation size change by modifying the fragmentation size cluster communication parameter on the source node.

8. The apparatus of claim 5, wherein the program is further configured to sequentially issue messages on the first and second message queues respectively using first and second threads executing on the source node.

9. A clustered computer system, comprising:
   (a) a plurality of nodes coupled to one another over a network, the plurality of nodes including a source node and a plurality of target nodes;
   (b) a source program resident on the source node, the source program configured to dynamically modify a fragmentation size cluster communication parameter in a clustered computer system by sending a sync message to the plurality of target nodes, thereafter waiting for an acknowledgment message for the sync message from each of the plurality of target nodes, thereafter sending a fragmentation size change message to each of the plurality of target nodes to modify a fragmentation size cluster communication parameter on such target nodes used in transmitting messages from the source node to the target nodes; and
   (c) a target program resident on each of the plurality of target nodes, the target program configured to send an acknowledgment message to the source node in response to the sync message to acknowledge receipt for each unacknowledged message received thereby, and to modify a fragmentation size cluster communication parameter associated therewith in response to the fragmentation size change message;
wherein the source program is further configured to send messages from the source node to the plurality of target nodes using the modified fragmentation size cluster communication parameter after modifying the fragmentation size cluster communication parameter; wherein the clustered computer system further comprises a first message queue resident on the source node, wherein the source program is configured to send the sync message and the fragmentation size change message by placing the sync message and the fragmentation size change message on the first message queue, wherein the source node and the plurality of target nodes are members of a first group, wherein the source node is a member of a second group that further includes as members a second plurality of target nodes, the clustered computer system further comprising a second message queue resident on the source node, wherein the source node includes first and second connections respectively associated with the first and second groups, wherein the source program is further configured to send the sync message by placing the sync message on the second message queue to initiate, upon receipt by each target node in the second group, an immediate acknowledgment message from such target node that acknowledges receipt for each unacknowledged message received by such target node, and wherein the source program is further configured to send the fragmentation size change message by placing the fragmentation size change message on the second message queue to modify the fragmentation size cluster communication parameter on each of the plurality of target nodes in the second group.

10. A program product, comprising:
 (a) a program configured to dynamically modify a fragmentation size cluster communication parameter in a clustered computer system by processing a requested fragmentation size change only after receipt of an acknowledgment message for at least one unacknowledged message sent by a source node to a plurality of target nodes; and
 (b) a signal bearing medium bearing the program;
wherein the program is further configured to process the requested fragmentation size change after receipt of the acknowledgement message to modify a fragmentation size cluster communication parameter used in transmitting messages from the source node to the plurality of target nodes, wherein the program is further configured to thereafter send messages from the source node to the plurality of target nodes using the modified fragmentation size cluster communication parameter; wherein the program is further configured to send a sync message from the source node to the plurality of target nodes such that deferring processing of the requested fragmentation size change includes waiting for an acknowledgement message for the sync message from each of the plurality of target nodes; wherein the program is configured to process the requested fragmentation size change by sending a fragmentation size change message from the source node to the plurality of target nodes, the fragmentation size change message configured to modify the fragmentation size cluster communication parameter on each of the plurality of target nodes, wherein the clustered computer system further comprises a message queue resident on the source node, wherein the program is configured to send the sync message and the fragmentation size change message by placing the sync message and the fragmentation size change message on the message queue, wherein the source node and the plurality of target nodes are members of a first group, wherein the source node is a member of a second group that further includes as members a second plurality of target nodes, the clustered computer system further comprising a second message queue resident on the source node, wherein the source node includes first and second connections respectively associated with the first and second groups, wherein the program is further configured to send the sync message by placing the sync message on the second message queue to initiate, upon receipt by each target node in the second group, an immediate acknowledgment message from such target node that acknowledges receipt for each unacknowledged message received by such target node, and wherein the program is further configured to send the fragmentation size change message by placing the fragmentation size change message on the second message queue to modify the fragmentation size cluster communication parameter on each of the plurality of target nodes in the second group.

11. The program product of claim 10, wherein the signal bearing medium includes at least one of a transmission medium and a recordable medium.

* * * * *